United States Patent [19]

Putman et al.

[11] 4,302,715

[45] Nov. 24, 1981

[54] DYNAMIC PARALLEL INDUCTIVE STABILIZER FOR SYNCHRONOUS MACHINES HAVING TORSIONAL OSCILLATIONS

[75] Inventors: Thomas H. Putman, Penn Hills; Donald G. Ramey, Churchill Borough, both of Pa.

[73] Assignee: Westinghouse Electric Corp., Pittsburgh, Pa.

[21] Appl. No.: 48,934

[22] Filed: Jun. 15, 1979

[51] Int. Cl.³ .............................. H02J 3/16; H02P 9/00
[52] U.S. Cl. .......................................... 323/210; 322/7
[58] Field of Search ........................... 322/7, 8, 29, 32; 323/101–104, 108, 116–119, 121, 127, 128, 201, 205, 208–211

[56] References Cited

U.S. PATENT DOCUMENTS

| | | | |
|---|---|---|---|
| 2,887,645 | 5/1959 | Polasek | 322/32 X |
| 3,849,677 | 11/1974 | Stacey et al. | 323/119 X |
| 3,932,808 | 1/1976 | Frank | 323/119 X |
| 3,963,978 | 6/1976 | Kelly et al. | 323/119 X |
| 3,999,115 | 12/1976 | South et al. | 322/32 X |

*Primary Examiner*—A. D. Pellinen
*Attorney, Agent, or Firm*—M. J. Moran

[57] ABSTRACT

This concerns a compensator for electrical lines fed by a turbine-generator. The mechanical properties of the turbine-generator are such that modulation of the terminal voltage is possible due to subsynchronous mechanical torsional oscillations. If the carrier frequency or synchronous frequency of the generator minus the torsional oscillation frequency is equal to the resonant frequency of the electrical line driven thereby, a relatively large side band current may flow in the electrical line at the resonant frequency. The effect of this current may feedback through the air gap of the generator to increase the torsional oscillation. A boot strapping effect between the electrical properties of the line and the torsional oscillation may thus result which could ultimately end in shaft breakage. The present apparatus utilizes the torsional oscillation signal to modulate compensating inductance connected in parallel between the lines of the electrical system to thus generate a small current at the appropriate electrical resonance frequency. This current leads to the production of a compensating line current at that frequency which in turn opposes the previously described undesirable effect.

14 Claims, 1 Drawing Figure

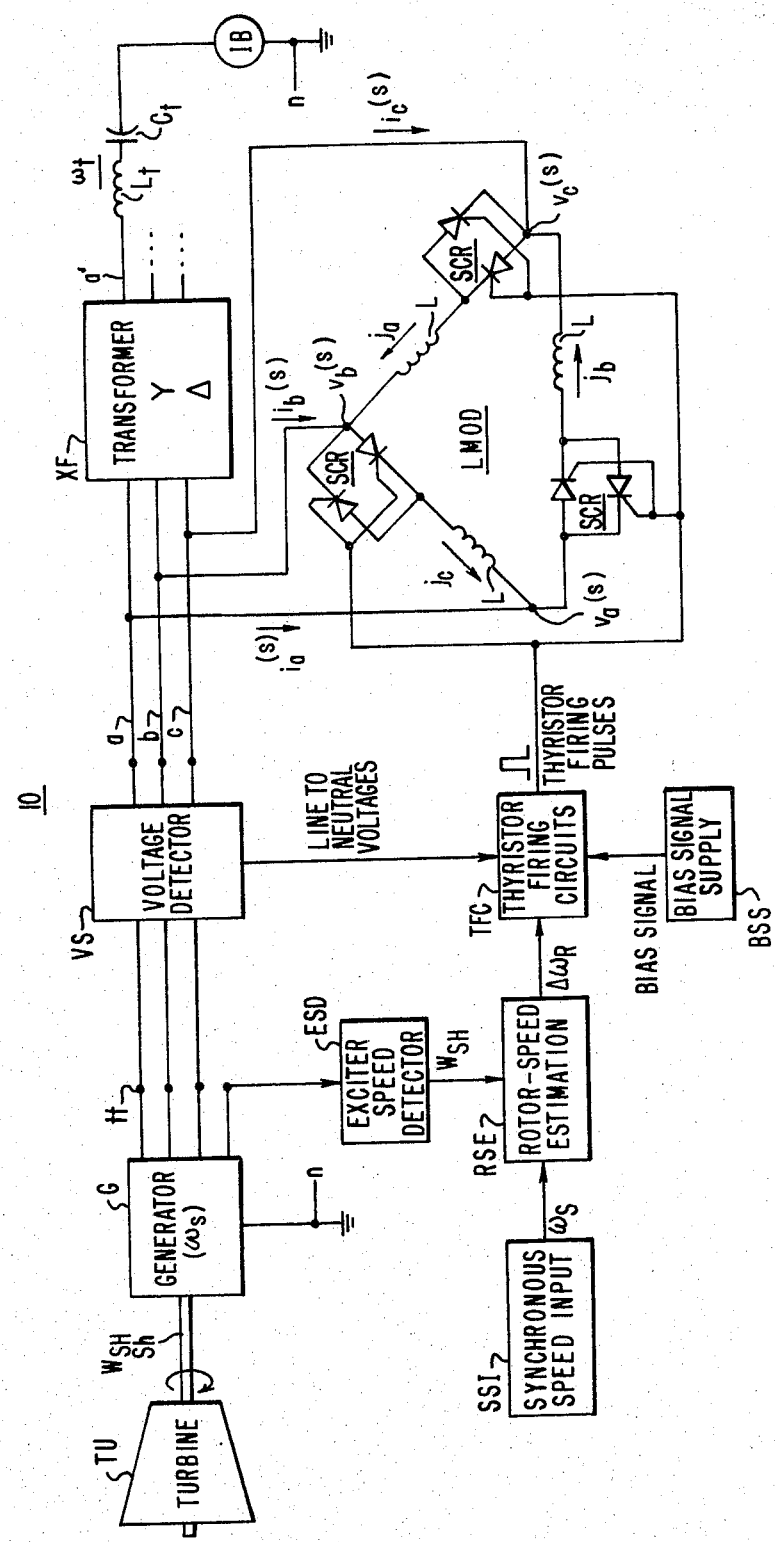

DYNAMIC PARALLEL INDUCTIVE STABILIZER FOR SYNCHRONOUS MACHINES HAVING TORSIONAL OSCILLATIONS

BACKGROUND OF THE INVENTION

This invention relates generally to feedback control for turbine driven high powered alternating current synchronous generator systems.

This invention relates more specifically to generator systems of the above type which are utilized to provide electrical power for loads over relatively long transmission lines where the effective series connected compensating capacitors may introduce torsional oscillation into the mechanical portion of the power generating system. Electrical generators are often driven from power sources such as steam turbines. Multiple rotating masses are usually present on the single shaft thereof. As an example, the rotating mass of one or more of the turbines and the rotating mass of the exciter for the AC generator and the rotating mass of the generator rotor may all be present. It has been found that because of the mechanical properties of the various parts of the rotating system, torsional oscillation will result involving the rotating masses. If these torsional oscillations become large and undamped, they could cause shaft breakage. It has been found in certain applications that such undamped torsional oscillations may exist because of the electrical properties of electrical system supplied by the AC synchronous generator. As an example, when long transmission lines are required for the delivery of energy to a grid network or load, the inductive effect of the long transmission lines may require series capacitive compensation. However, the effect of the compensating capacitors being connected in series circuit relationship with the inductance tends to cause certain resonant frequencies to exist in the electrical network. The electrical effect of these resonant frequencies may be fed by the magnetic coupling between the stator and the rotor of the synchronous generator to the mechanically rotating shaft. If the previously described electrical resonance cooperates with a critical mechanical resonance between the masses of the generating system, reinforced, undamped torsional oscillation will occur which may be of sufficient magnitude to break the shaft. Apparatus and method for solving this problem has been proposed in the past in U.S. Pat. No. 3,662,251, issued May 9, 1972 to O. J. M. Smith, entitled, "Method and System for Measuring Acceleration and Velocity". This latter patent is related to the sensing of oscillations rather than providing a method for directly correcting for the effect of the oscillation. A similar measuring method and apparatus is described in U.S. Pat. No. 3,662,252, issued May 9, 1972 to O. J. M. Smith and entitled, "Tachometer and Method of Obtaining a Signal Indicative of Alternating Shaft Speed". Other U.S. patents propose apparatus for stabilizing low frequency power oscillation by measuring some parameter of a system and operating on the field excitation of the generator for corrective action. Examples of these patents are: U.S. Pat. No. 3,477,014, issued to A. L. Blythe on Nov. 4, 1969 and entitled, "Electrical Control System With Stabilizing Control Means", U.S. Pat. No. 2,981,882, issued Apr. 25, 1961 to M. Rosenblatt, entitled, "Stabilizing Circuit for Dynamoelectric Machines" and U.S. Pat. No. 3,656,048, issued Apr. 11, 1972 to A. W. Hauf, entitled, "Nonlinear Exciter Controller for Power System Damping". Patents which are of interest for showing field control in electrical apparatus are: U.S. Pat. No. 2,854,617, issued Sept. 30, 1958 to L. J. Johnson and entitled, "Frequency Control Apparatus for Alternators" and U.S. Pat. No. 3,474,323, issued Oct. 21, 1969 to L. A. Kilgore et al., entitled "Electrical Control Systems With Stabilizing Control Means". Still other patents which may be of interest generally in this area are: U.S. Pat. No, 3,119,934, issued Jan. 28, 1964 to R. H. Lee, entitled, "Generator Control Means" and U.S. Pat. No. 3,167,702, issued Jan. 26, 1965 to A. Schonung et al., entitled, "Vibration Damping Arrangement for Rotary Field System of Excitation Regulation Synchronous Machines". Another patent which is related to frequency control by mechanical means is U.S. Pat. No. 2,767,367, issued Oct. 16, 1956 to L. Black and entitled, "Generator Frequency Control by Electric Breaking". All of the aforementioned patents are background patents for a U.S. Pat. No. 3,999,115, issued Dec. 21, 1976 to South et al. and entitled, "Dynamic Stabilizer for Synchronous Machines Having Torsional Oscillations and Method". It is submitted that the latter patent represented a significant improvement in the state of the art for compensating for the effect of mechanical torsional oscillation as it is affected by electrical power line resonance, where the compensation takes place in the electrical system per se. However, even the latter patent had certain disadvantages. One disadvantage lies in the fact that the compensating apparatus of the latter patent is essentially series connected in the transmission system to be compensated. Furthermore, the apparatus of the latter mentioned patent requires a frequency conversion. The frequency conversion is related to the frequency of the line resonance rather than the frequency of the torsional oscillation resonance. The former disadvantage means that the compensating device must continuously pass the total output current of the generator. Furthermore, in order to take the device out of the system, it must be short circuited. The latter disadvantage means that a frequency conversion must be made. It would be advantageous therefore, if apparatus could be found in which the compensating device was essentially a parallel connected device rather than a series connected device and in which the actual torsional oscillation frequency could be used as a modulating signal rather than the frequency of the resonance of the line.

SUMMARY OF THE INVENTION

In accordance with the invention, apparatus is taught in which a three-phase electrical generator of the type which is usually driven by a steam turbine generates a terminal voltage which has a synchronous 60 Hz major component and two relatively small or minor components at side band frequencies. The side band frequency components are related to the torsional oscillation frequency of the rotating mechanical system. To be more specific, the side band components are equal to 60 Hz minus the torsional oscillation frequency and 60 Hz plus the torsional oscillation frequency. The torsional oscillation frequency is usually a function of the mechanical resonance of the rotating system. If the electrical resonance of the line is equal to one of the lower side band frequencies, then a very large side band current will flow and furthermore, the enlarged side band current will feed back through the air gap of the generator to increase the mechanical oscillation. A three-phase delta connected inductor network is interconnected with the three-phase lines for compensation. Each delta leg comprises an inductor connected in series with a pair of oppositely disposed silicon controlled rectifiers. A rotor speed estimator is interconnected with the shaft of the turbine generator system to estimate the rotor torsional velocity deviation from the synchronous speed and to provide an output signal related thereto. The output signal is fed to a thyristor firing circuit where firing pulses for the thyristors in the delta connected inductor circuit are determined. Essentially, the inductance of the inductor circuit is modulated by the frequency of the torsional oscillation thus providing a side band inductor current at a resonant frequency of the line. This current reacts with the impedance of the line to provide a compensating circulating current between the line inductance and the line capacitance which acts to counteract the previously-described side band current from the generator. This has a tendency to reduce the torsional oscillation.

BRIEF DESCRIPTION OF THE DRAWINGS

For a better understanding of the invention, reference may be had to the preferred embodiment thereof shown in the accompanying FIGURE in which an electrical system is shown with an "L" type modulator.

DESCRIPTION OF THE PREFERRED EMBODIMENTS

Referring now to the drawing, an electrical system with an "L" type modulator is shown. The system comprises an AC generator G which is driven by a turbine unit TU which is interconnected to the generator G by way of a common shaft Sh. The nominal electrical frequency is $\omega_s$. Ideally, the generator shaft Sh turns at a speed sufficient to generate this frequency in an unvarying sense. In actuality however, since the mechanical system associated with the generator G and the turbine TU includes damping, resilience, etc., the shaft may have a tendency to oscillate at some relatively low mechanical resonant frequency. The mechanical or torsional oscillation modulates the electrical frequency $\omega_s$ to provide three frequency components at the output or terminals tt of the generator G. There is present a major voltage component at the frequency $\omega_s$ and minor or lesser side band voltage components at frequency $\omega_s$ minus the torsional oscillation frequency and at the frequency $\omega_s$ plus the torsional oscillation frequency. Interconnected with the three terminals is a voltage detector VS, the use of which will be described hereinafter. Interconnected with the voltage detector are the three phase AC lines a, b and c which are interconnected with the input winding of a wye-to-delta (Y-Δ) connected transformer XF. Connected to the output winding of the transformer XF are three lines, only one of which, a', is shown. For purposes of simplicity of illustration, there is further shown a line inductance $L_t$ and a line capacitance $C_t$. The line a' is shown interconnected with an infinite bus IB which in turn is returned to the generator by way of a neutral n or ground. If the line a' is extremely long, the line inductance $L_t$ becomes very large thus requiring series capacitive compensation. The series capacitors $C_t$ are often supplied by the generator manufacturer. The relatively large capacitance $C_t$ and the relatively large inductance $L_t$ connected in series cooperate to provide a resonant frequency $\omega_t$ which may be in the subsynchronous range of the voltage generator G. That is to say, the resonant frequency $\omega_t$ may be less than 60 Hz. Unfortunately, the mechanical or torsional oscillation characteristic of the mechanical system for the generator G is also often in the subsynchronous range and it is not unlikely that the resonant frequency of the electrical circuit $\omega_t$ may be equal to $\omega_s$ minus the resonant frequency $\omega_m$ of the mechanical system. If this happens, the subsynchronous side band or low frequency side band of the modulated generator output voltage may cause an extremely high current to flow in the electrical system. This current in turn may feed back magnetically through the air gap of the generator to further excite the torsional oscillation of the mechanical portion of the generator. This effect tends to boot strap thus eventually causing mechanical damage such as shaft breakage in the generator system. To provide compensation for this, an inductive modulator L MOD is provided. The inductive modulator comprises three delta connected branches. Each branch of the delta connected network comprises an inductor L and a pair of oppositely-disposed, parallel-connected, silicon controlled rectifiers SCR. The gates of the silicon controlled rectifiers SCR may be actuated to allow current to flow through each of the inductors L. There is provided a rotor speed estimator RES which is connected at one input thereof to an exciter shaft speed detector ESD which in turn is interconnected in some convenient manner with the generator system for measuring or detecting shaft speed $\omega_{sH}$. An example of this is a shaft mounted tooth wheel between the rotor and the exciter. There is also provided a synchronous speed input device SSI which is interconnected to another input of the rotor speed estimator RSE for providing an indication of the underlying or basic synchronous speed $\omega_s$ of the shaft. The shaft speed $\omega_{sH}$ and the synchronous speed $\omega_s$ are operated upon by the rotor speed estimator RSE to provide an output signal $\Delta\omega_R$ which is equal to the variation of the rotor speed relative to the synchronous speed frequency. This is accomplished by measuring the shaft speed $\omega_{sH}$ and estimating the change in generator rotor speed $\Delta\omega_R$ as a function thereof. The output signal from the rotor speed estimator is the signal $\Delta\omega_R$ which represents a change in the generator rotor speed. The frequency of the change in the rotor speed is, of course, the torsional oscillation frequency, and it is this $\Delta\omega_R$ or change in rotor speed signal which causes the oscillation in the voltage at the terminals tt. This modulating signal is provided to the thyristor firing circuit TFC which operates in conjunction with the bias signal supply BSS and line-to-neutral voltage input from the voltage detector VS to provide thyristor firing pulses at firing angles which are related to the change in generator rotor speed which in turn, of course, is related to the torsional oscillation. Since the thyristor firing pulses are provided to the silicon controlled rectifiers SCR of the inductive modulator L MOD, the effect is to modulate the currents in the inductive modulator L MOD by the change in generator rotor speed $\Delta\omega_R$ which represents the subsynchronous torsional oscillation frequency. The voltages at each node corner of the delta connected inductive modulator L MOD are $v_a{}^{(s)}$, $v_b{}^{(s)}$ and $v_c{}^{(s)}$. The currents between each of these nodes and the lines a, b and c are $i_a{}^{(S)}$, $i_b{}^{(s)}$, and $i_c{}^{(s)}$, respectively. These currents divide up into inductor currents, $j_a$, $j_b$, and $j_c$. Current $j_a$ flows between the voltage node represented by the voltages $v_b{}^{(s)}$ and $v_c{}^{(s)}$. In a like manner, the current $j_b$ flows between the nodes represented by the voltages $v_a{}^{(s)}$, $v_c{}^{(s)}$, and finally the inductor current $j_c$ flows between the nodes represented by the voltages $v_b{}^{(s)}$ and $v_a{}^{(s)}$. The voltages $v_a{}^{(s)}$, $v_b{}^{(s)}$, and $v_c^{(s)}$ can be thought of as being equal only to the center frequency voltage between the appropriate output terminals tt of the generator G. In other words, the relatively small side band voltages are ignored. It is the latter center frequency voltage which cooperates with the inductive elements L to create the previously described inductive currents $j_a$, $j_b$, and $j_c$. These latter currents therefore are relatively independent of the side band voltages produced at the generator terminals tt. However, these currents are modulated by switching on and off the silicon controlled rectifier SCR in a time sequence which is related to the torsional oscillation frequency. This has the effect of modulating the inductance L by the torsional oscillation frequency, thus causing the currents $j_a$, $j_b$, $j_c$ to have three components, one of which is a majority or midband component at the carrier frequency $\omega_s$ of the voltage at the terminals tt of the generator G. However, the modulation effect produces side band currents which have frequencies equal to the carrier frequency $\omega_s$ minus the modulation frequency and the carrier frequency plus the modulation frequency. However, since the modulation frequency is essentially the frequency of the torsional oscillations, the side band currents have frequencies equal to the carrier frequency $\omega_s$ minus the torsional oscillation frequency and the carrier frequency $\omega_s$ plus the torsional oscillation frequency. It will be recalled, however, that the lower sideband current is at a frequency which is equal to the resonant frequency $\omega_t$ of the electrical system. Consequently, this very small current will excite a relatively large current in the line due to the resonance characteristics of the line. Fortunately, the phase of this current is in opposition to the phase of the current coming from the generator and thus has a tendency to reduce or cancel the generator current at that frequency. Since this latter lower side band current is cancelled, the previously described boot strapping effect associated with increasing torsional oscillation is reduced or eliminated.

In regard to the preceding, the preferred embodiment of the invention as shown generally requires knowledge of the actual speed of the generator rotor to determine the firing angles of the thyristors SCR associated with the L-type modulator. Unfortunately, in most turbine-generators, the change in generator rotor speed, $\Delta\omega_R$, cannot easily be measured. On the other hand, a measurement of the speed $\omega_{sH}$ between the generator rotor and exciter is usually available. Consequently, the function of the rotor speed estimator RSE is to estimate the change in the actual generator rotor speed $\Delta\omega_R$ given the shaft speed $\omega_{sH}$. Any circuit which performs this function may be utilized. If, on the other hand, actual knowledge of the rotor speed is available, then the rotor speed estimator may be replaced by a rotor speed detecting device. For purposes of simplicity, the incremental generator rotor speed $\Delta\omega_R$ may be related to the generator rotor speed $\omega_R$ minus the synchronous speed $\omega_s$. The synchronous speed $\omega_s$ is subtracted out so that in subsequent amplification and signal processing, a large average value does not have to be contended with. All of the oscillating modes of the rotor system are exhibited by the $\Delta\omega_R$ signal. The conduction angles of the thyristor are related to the incremental speed signal $\Delta\omega_R$ such than an increase in $\Delta\omega_R$ reduces the conduction angle and a decrease in $\Delta\omega_R$ increases the conduction angle. The actual thyristor firing circuits may take several forms, but whatever form is used, the required inputs in addition to the $\Delta\omega_R$ signal include the line-to-neutral voltages or the line-to-line voltages as the case may be and a bias signal. Such apparatus is disclosed and described in U.S. Pat. No. 3,999,117 entitled "Method And Control Apparatus For Static VAR Generator And Compensator" issued Dec. 21, 1976 to L. Gyugyi et al. The bias signal sets the quiescent operating point of the L-type modulator L MOD by setting the thyristor conduction angle at about 125°, for example, when $\Delta\omega_R$ is zero. Pulses from the thyristor firing circuits fire the thyristors SCR which are associated with the L-type modulator L MOD. The function of the L-type modulator is to modulate the apparent inductance which is connected to the terminals tt of the generator G. This is done by changing the conduction angles of the thyristors SCR which control the currents $j_a$, $j_b$ and $j_c$ which flow through each inductor L. Because the current which passes through the inductor L is high in harmonic content, particularly the third, the reactors or inductors L are connected in delta circuit configuration in the preferred embodiment of the invention. This prevents the third harmonic of current as well as certain higher harmonics from flowing in the lines a, b and c which feed the modulator L MOD. Consequently, the currents $i_a^{(s)}$, $i_b^{(s)}$, and $i_c^{(s)}$ shown in the Figure are reasonable approximations of sine waves. In the preferred embodiment of the invention, the modulator is connected to lines a, b and c close to the terminals tt of the generator G. The voltage detector VS is not considered as part of the load. The stabilizing circuit not only makes the system dynamically stable, but also quickly attenuates any subsynchronous resonance oscillation mode which is excited by electrical system disturbances. However, the generator terminals tt/fig. are not necessarily the optimum location for the stabilizer or compensator. The output terminals of the generator transformer XF may be more suitable in some embodiments of the invention as connection there tends to reduce the volt ampere rating of the stabilizer. This is because there is more inductive reactance between the stabilizer and the generator G. As a result of this, the amplification of the lower side band (subsynchronous) frequency current in the generator would be higher. This enchances the stabilizers capability of exciting a counter subsynchronous resonance current in the stator circuit of generator G.

It should be remembered that the mechanical system comprising the mass-elastic system of the turbogenerator unit represented by the turbine TU and the generator G exhibits certain normal modes, most of which result in some oscillatory motion of the generator rotor. In addition the electrical system has a principal oscillatory mode which is determined by the series capacitance $C_t$, transmission line inductance $L_t$, and the subtransient reactance of the generator G. The mechanical and electrical modes are non-interreactive to the extent that their frequencies are virtually independent. That is, a change in an electrical parameter will not significantly change the frequency of the mechanical mode and vice versa. However, if the electrical mode frequency corresponds to the synchronous frequency, for instance, 60 Hz, minus the frequency of a mechanical mode, then a coupling takes place which manifests itself as negative damping for both the electrical mode and the mechanical mode. As a result of this coupling, the amplitude of the oscillatory modes grows in time.

It should be kept in mind that when the machine rotor oscillates at one of its normal modes, a type of modulation of the terminal voltage of the machine occurs.

Although this modulation is neither amplitude nor phase modulation in the classical sense, the effect of the modulation at the generator terminals tt is a voltage with components at the carrier frequency $\omega_s$, a lower side band frequency and an upper side band frequency, as mentioned previously. The side band frequencies differ from the carrier frequency $\omega_s$ by the mechanical oscillation frequency. The carrier frequency is the normal power system frequency of 60 Hz in most cases. In addition, the side band voltages are balanced polyphase voltages with 120° relative phase angle at the side band frequency. Of course, the side band frequencies cannot exist without corresponding side band currents which will also be balanced polyphase currents. Because the impedance of the system is frequency dependent, the current at the upper side band frequency will be much different than that of the lower side band frequency. When subsynchronous oscillation occurs, the stator circuit is in resonance at the lower side band frequency sb and a very large lower side band current eventually builds up. It is this current which gives rise to a negative damping torque. It should be realized that the lower sideband current takes many cycles to build up because of sharply tuned resonance, but the build-up is inexorable. If the lower side band current caused by the rotor oscillation results in negative damping, a lower side band current with exactly the opposite phase would produce positive damping. The purpose of the L-type modulator L MOD of the active stabilizer is to generate lower side band polyphase currents which are 180° out of phase from those generated by the rotor oscillations. The stabilizer therefore, is a lower side band current generator.

With respect to the preferred embodiment of the invention, computer simulation has led to the determination of pertinent parameters for one specific 410 MVA generator with a line-to-line voltage equal to 22 KV which are listed below:

Inductance L=25.7 mh
Quiescent Line Current (Fundamental) IL=2333 amps, peak=1653 amps, rms
Quiescent Phase Current (Fundamental) IP=1345 amp, peak=950 amps, rms
Quiescent Reactive Power at 22 KV, $Q=62.7 \times 10^6$ volt-amp for three phases
Quiescent Conductive Angle of Thyristors SCR $\theta_c=125°$
The Full Load Current of the Machine IF=10,760 amps, rms (approximate)
Full Load Current Requirement of the Stabilizer in Percentage of Full Load Current of the Machine=15.4%.

It is to be understood with respect to the embodiments of the invention that the rotor speed estimator RES may be replaced by a rotor speed detector in some embodiments of the invention. Furthermore, the rotor speed estimator may take on any convenient form provided its output is a signal which is indicative of the torsional oscillation of the rotor portion of the generator G. It is also to be understood that the delta configuration shown in the FIGURE is preferred but not exclusive for correct operation of the stabilizer. It is also to be understood that the three-phase configuration shown in the FIGURE is illustrative but not limiting and that single phase stabilization is possible in the present invention as is other kinds of polyphase stabilization. It is also to be understood that the mechanical representation shown by the arrangement of the turbine unit TU and generator G is merely illustrative. The number of stages for the turbine unit and the generator's relationship therewith may take on many forms. It is also to be understood that the circuit may or may not be grounded as shown in the preferred embodiment of the invention.

The apparatus taught with respect to the embodiments of this invention have many advantages. One advantage lies in the fact that the embodiments of this invention represent parallel connected stabilizer circuits rather than series connected stabilizer circuits as shown in the prior art. This means that the stabilizer circuits do not have to continuously pass the full load current of the electrical system (lower losses) nor do they have to be shorted out to be taken out of service. Another advantage lies in the fact that L-type modulation is done at the torsional oscillation frequency rather than at the resonant frequency of the line circuit as is done in the prior art. This means that a frequency conversion or frequency dependent signal conditioning does not have to be made. The advantage lies in the fact that frequency conversion may lead to inaccuracies, phase lifting and the like.

We claim:

1. A compensator for an electrical generating system of the kind which generates an electrical voltage of a nominal frequency ($\omega_s$) for an electrical circuit which has an electrical resonance at an electrical resonant frequency ($\omega_t$), where the electrical generating system has a mechanical motion resonance at a mechanical resonant frequency ($\omega_m$), where a mechanical motion at said mechanical motion resonant frequency ($\omega_m$) will modulate said electrical voltage of said nominal frequency ($\omega_s$) to produce a difference frequency electrical current in said circuit, the difference frequency ($\omega_D$) being equal to the difference between said nominal frequency ($\omega_s$) and said mechanical motion resonance frequency ($\omega_m$), said difference frequency ($\omega_D$) when equal to said electrical resonant frequency ($\omega_t$) of said circuit being such that interaction between said difference frequency current and said mechanical motion resonance tends to increase the effect of the mechanical motion, comprising:
   (a) mechanical motion detecting means interconnected with said generating system for determining a characteristic of said mechanical motion and for an oscillation providing an output signal related thereto; and
   (b) modulatable impedance means interconnected in circuit relationship with said electrical circuit in such a manner that a carrier current for said electrical system which is generally at said nominal frequency ($\omega_s$) is produced, said mechanical motion detecting means being interconnected with said impedance means in such a manner that said carrier current is modulated by said output signal to thus provide a side band current which has a frequency ($\omega_{sB}$) generally equal to said difference frequency, said side band current thus causing a component of compensating current to flow in said electrical circuit in opposition to said difference frequency current in said circuit to thus compensate for the effects thereof to reduce said tendency to increase said mechanical motion.

2. The combination as claimed in claim 1 wherein said tendency to increase said mechanical motion is reduced to zero.

3. The combination as claimed in claim 1 wherein said determined characteristic of said mechanical oscillation is the frequency thereof.

4. The combination as claimed in claim 1 wherein said determined characteristic of said mechanical oscillation is the phase thereof.

5. The combination as claimed in claim 1 wherein said determined characteristic of said mechanical oscillation is the zero cross over points thereof.

6. The combination as claimed in claim 1 wherein said determined characteristic of said mechanical oscillation is the maximum deviation thereof.

7. The combination as claimed in claim 1 wherein said determined characteristic of said mechanical oscillation is the amplitude thereof.

8. The combination as claimed in claim 1 wherein said impedance means is essentially inductive in nature.

9. The combination as claimed in claim 1 wherein said impedance means is essentially capacitive in nature.

10. The combination as claimed in claim 1 wherein said impedance means is essentially resistive in nature.

11. A compensator for an electrical generating system of the kind which generates electrical voltage of a nominal frequency ($\omega_s$) for an electrical circuit which has an electrical resonance at an electrical resonant frequency ($\omega_i$), where the electrical generating system has a mechanical motion resonance at a mechanical resonant frequency ($\omega_m$), where a mechanical oscillation at said mechanical motion resonant frequency ($\omega_m$) modulates said electrical voltage of nominal frequency ($\omega_s$) to provide a difference frequency electrical current in said circuit, the difference frequency ($\omega_D$) being equal to the difference between said nominal frequency and said mechanical motion resonance frequency, said difference frequency also being generally equal to said electrical resonant frequency of said circuit so that said difference frequency current is generally unattenuated by the circuit impedance so that interaction between said difference frequency current and said mechanical motion resonance tends to increase the effect of the mechanical motion, comprising:

(a) mechanical motion detecting means interconnected with said generating system for determining the frequency, wave shape, amplitude and phase of said mechanical oscillation and for providing an output signal related thereto; and (b) modulatable inductance means interconnected in circuit relationship with said electrical circuit in such a manner that said electrical voltage is impressed thereacross to produce an inductive carrier current for said electrical system which is generally sinusoidal and which is generally at said nominal frequency ($\omega_s$), said mechanical motion detecting means being interconnected with said inductance means in such a manner that said inductive carrier current is modulated by said output signal to thus provide a relatively small inductive side band current which has a frequency ($\omega_{sB}$) generally equal to said difference frequency and said electrical resonant frequency, said relatively small value of inductive side band current thus causing a relatively large component of compensating current to flow in said electrical circuit in opposition to said generally unattenuated difference frequency current in said circuit to thus compensate for the effects thereof to thus reduce said tendency to increase said torsional mechanical oscillation.

12. A compensator for an electromechanical generator system which provides alternating electrical current to an electrical circuit at a nominal frequency of 60 Hz, said electrical circuit having an electrical resonance with an attendant electrical resonant frequency, said electro-mechanical generator system having a mechanical torsional oscillation mode with an attendant torsional oscillation mechanical resonant frequency, said torsional oscillation mode modulating said nominal frequency to provide an electrical circuit current component with a component frequency which is generally equal to the difference between said nominal frequency and said mechanical resonant frequency, said component frequency also being generally equal to said electrical resonant frequency so that said current coponent tends to interact with said mechanical torsional oscillation mode in a manner which reinforces said mechanical torsional oscillation mode comprising:

(a) mechanical motion detecting means interconnected with said generating system for determining the frequency, wave shape, amplitude and phase of said mechanical torsional oscillation and for providing an output signal related thereto; and (b) modulatable inductance means interconnected in circuit relationship with said electrical circuit in such a manner that the alternating electrical voltage from said generator system is impressed thereacross to produce an inductive carrier current for said electrical system which is generally sinusoidal and which is generally at said nominal frequency, said mechanical motion detecting means being interconnected with said inductance means in such a manner that said inductive carrier current is modulated by said output signal to thus provide a relatively small inductive side band current which has a frequency generally equal to said difference frequency and said electrical resonant frequency, said relatively small value of inductive side band current thus causing a relatively large component of compensating current to flow in said circuit in opposition to said generally unattenuated difference frequency current in said circuit to thus compensate for the effects thereof to reduce said tendency to increase said mechanical motion.

13. A compensator for an electromechanical generator system of the kind which is subject to subsynchronous oscillation, where said subsynchronous oscillation is related to the modulation of the synchronous shaft speed of said generator system by a mechanical torsional oscillation the frequency of which corresponds to a resonant torsional oscillation mode frequency for said rotating mechanical system, a component of current in the electrical system supplied by said generator system having a component current frequency the value of which is related to the difference between the synchronous frequency of said generator system and said resonant torsional oscillation mode frequency, said electrical system having an electrical resonant frequency which is generally equal to said component current frequency so that said component current tends to react with said mechanical portion of said generator system to reinforce said torsional oscillation, comprising:

(a) mechanical motion detecting means interconnected with said generating system for determining the frequency, wave shape, amplitude and phase of said mechanical torsional oscillation and for providing an output signal related thereto, and (b) modulatable inductance means interconnected in circuit relationship with said electrical circuit in such a manner that the electrical voltage of said generator system is impressed thereacross to produce an inductive carrier current for said electrical circuit which is generally sinusoidal and which is generally at said nominal frequency associated with said synchronous shaft speed, said mechanical motion detecting means being interconnected with said inductance means in such a manner that said inductive carrier current is modulated by said output signal to thus provide a relatively small inductive side band current which has a frequency generally equal to said difference frequency and said electrical resonant frequency, said relatively small value of inductive side band current thus causing a large component of compensating current to flow in said system in opposition to said generally unattenuated difference frequency current in said circuit to thus compensate for the effects thereof to reduce said tendency to increase said torsional mechanical oscillation.

14. A compensator for an electrical generating system of the kind which generates an electrical voltage of a nominal frequency ($\omega_s$) for an electrical circuit which has an electrical resonance at an electrical resonant frequency ($\omega_t$), where the electrical generating system has a mechanical motion resonance at a mechanical resonant frequency ($\omega_m$), where a mechanical motion at said mechanical motion resonant frequency ($\omega_m$) modulates said electrical voltage of nominal frequency ($\omega_s$) to provide a difference frequency electrical current in said circuit, the difference frequency ($\omega_D$) being equal to the difference between said nominal frequency ($\omega_s$) and said mechanical motion resonance frequency ($\omega_m$), said difference frequency ($\omega_D$) also being generally equal to said electrical resonant frequency ($\omega_t$) of said circuit so that interaction between said difference frequency current and said mechanical motion resonance tends to increase the effect of the mechanical motion, comprising:

(a) mechanical motion detecting means interconnected with said generating system for determining the speed variation of said mechanical motion as a function of time and for providing an output signal related thereto; and (b) modulatable reactance means interconnected in circuit relationship with said electrical circuit in such a manner that a reactive carrier current for said electrical system which is generally sinusoidal and which is generally at said nominal frequency ($\omega_s$) is produced, said mechanical motion detecting means being interconnected with said reactance means in such a manner that said reactive carrier current is modulated by said output signal to thus provide a relatively small inductive side band current which has a frequency ($\omega_{sB}$) generally equal to said difference frequency and said electrical resonant frequency, said relatively small value of inductive side band current thus causing a relatively large component of compensating current to flow in said electrical circuit in opposition to said generally unattenuated difference frequency current in said circuit to thus compensate for the effects thereof to reduce said tendency to increase said mechanical motion.

* * * * *